Aug. 23, 1938.  M. P. GRAHAM ET AL  2,127,912
TRAILER HITCH
Filed Nov. 2, 1936
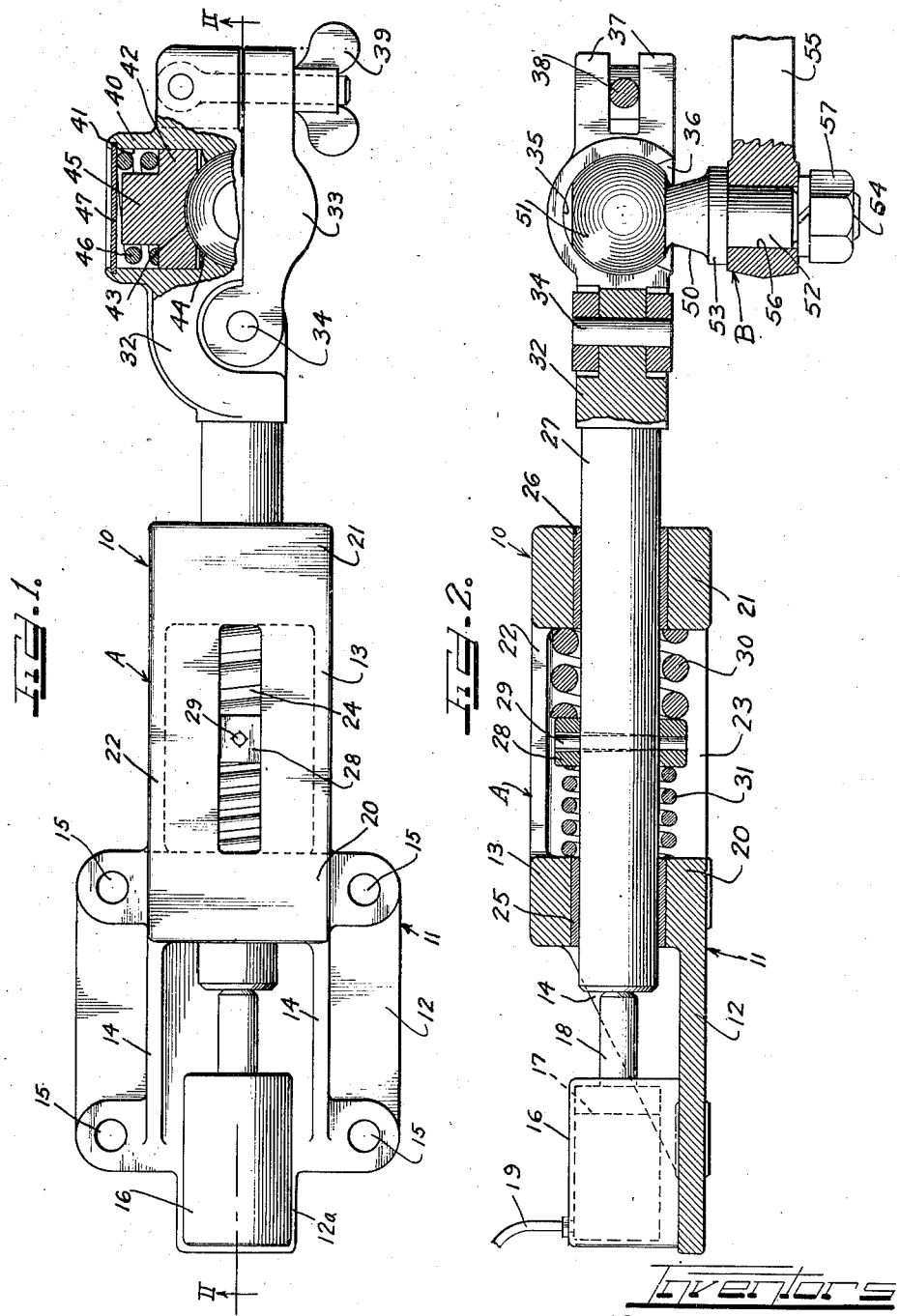
Inventors
MATTHEW P. GRAHAM.
GEORGE H. HUFFERD.
JOSEPH E. CASSE.
by Charles A. Wills Attys.

Patented Aug. 23, 1938

2,127,912

UNITED STATES PATENT OFFICE 2,127,912

TRAILER HITCH

Matthew P. Graham, George H. Hufferd, and Joseph E. Casse, Detroit, Mich., assignors to Thompson Products Incorporated, Cleveland, Ohio, a corporation of Ohio Application November 2, 1936, Serial No. 108,782

3 Claims. (Cl. 188—142)

This invention relates to hitches for connecting a trailer with a propelling vehicle and includes an automatic trailer brake applier. More specifically the invention relates to a trailer hitch adapted to automatically apply the brakes on a trailer upon forward surging of the trailer toward the propelling vehicle.

The ordinary brakes on a vehicle require a force to apply them. When a vehicle is towing another vehicle such as a trailer the forward surging of the trailer onto the propelling vehicle will unduly load the brakes of the propelling vehicle requiring greater force to apply them and greater braking capacity for the vehicle. It is therefore an essential safety factor that the trailer or drawn vehicle be equipped with brakes so as not to unduly load the brakes of the propelling vehicle. Operative brake connections between the propelling vehicle and trailer, however, are not desirable because of added expense and manual operation necessary to unite these connections.

This invention now provides for a single connection between the propelling vehicle and the trailer which serves to automatically apply the trailer brakes upon forward surging of the trailer onto the propelling vehicle. The connecting device or trailer hitch of this invention includes two interconnecting parts one of which is secured to the propelling vehicle and the other of which is secured to the trailer. The trailer part includes a frame member adapted to be rigidly attached to the front end of the trailer and has a tongue slidable therein which is resiliently held against longitudinal movement by spring members. The tongue member has a ball socket at the front end thereof for engagement with the ball end of a stud carried by the propelling vehicle part of the hitch. The other end of the tongue operates the trailer brake control so that when the trailer surges onto the propelling vehicle the tongue slides through the frame member against spring pressure to actuate the brake control device thereby applying the brake solely with the energy created by the forward surge.

The trailer hitch of this invention is exceedingly simple in construction and affords a readily connected hitching means between the propelling vehicle and the trailer as well as an automatic trailer brake applying means.

It is then an object of this invention to provide a resilient connection between a propelling vehicle and a towed vehicle which automatically applies the brakes on the towed vehicle upon forward surging of said vehicle onto the propelling vehicle.

A further object of this invention is to provide a resilient tongue connection between a propelling vehicle and a trailer which automatically applies the trailer brakes upon forward surging of the trailer onto the propelling vehicle.

A further object of this invention is to provide a single ball and socket connection between a propelling vehicle and a towed vehicle with automatic wear take-up means.

A further object of this invention is to provide an improved trailer hitch and trailer brake applier in a single compact unit.

A specific object of this invention is to provide a resilient coupling between a propelling vehicle and a towed vehicle which automatically applies the brakes on the towed vehicle whenever said vehicle surges forwardly onto the propelling vehicle.

Other and further objects of this invention will become apparent to those skilled in the art from the following detailed description of the annexed sheet of drawings which discloses a preferred embodiment of the invention.

It should be understood that the trailer hitch illustrated on the drawing represents only one of the modifications of this invention and that details of construction thereof may be changed throughout a wide range without departing from the scope of the invention.

On the drawing:

Figure 1 is a plan view, with a part cut away and shown in horizontal cross section, of a trailer hitch according to this invention.

Figure 2 is a vertical cross sectional view, with parts shown in elevation taken substantially along the line II—II of Figure 1.

As shown on the drawing:

The reference numeral 10 designates generally a trailer hitch according to this invention composed of a portion A adapted to be rigidly connected to the front end of a trailer and a portion B adapted to be rigidly connected to the rear end of a propelling vehicle. The portions A and B of the hitch 10 are readily interconnected with each other.

The trailer portion A of the hitch 10 includes a rigid frame member 11 having a rear flat plate portion 12 and a cylindrical portion 13 extending forwardly therefrom. Webs 14 reinforce the cylindrical portion with the plate portion so as to provide a strong, rigid integral frame. The flat plate portion 12 has a rearwardly extending tail or tab 12a.

The corners of the flat plate part 12 have thickened portions with holes 15 drilled therethrough for receiving bolts to secure the frame 11 to the front part of a trailer.

A fluid tight master cylinder 16 is mounted on the plate 12 between the webs 14 thereof and on the tail 12a of the plate 12. The master cylinder 16 holds hydraulic fluid for operating the trailer brakes.

As shown in Figure 2 a piston or plunger 17 is seated in the cylinder 16 and has a shank portion 18 extending therefrom through the cylinder towards the cylindrical portion 13 of the frame. A pipe or tube 19 communicates with the cylinder 16 for transmitting the hydraulic fluid forced therefrom by the plunger 17 to apply the brakes.

The cylindrical portion 13 of the frame 11 comprises two horizontally spaced bosses 20 and 21 connected by side walls 22 defining intermediate of the bosses a chamber 23 open at the bottom and closed at the top except for a slot 24 cut through the walls 22 as indicated in Figure 1.

The boss portions 20 and 21 receive cylindrical bearing sleeves 25 and 26 respectively. A solid rod or tongue 27 is slidable in the sleeves 25 and 26 and extends through the chamber 23 into abutting relation with the shank 18 of the plunger 17 in the master cylinder 16.

A collar 28 is disposed around the rod 27 in the chamber 23 and is pinned to the rod by means of a pin 29 extending therethrough.

A heavy coiled spring 30 is disposed around the rod 27 between the boss 21 and the collar 28. A lighter coiled spring 31 is disposed around the rod 27 between the boss 20 and the collar 28. The springs 30 and 31 abut the collar on both sides thereof so that a sliding of the rod 27 in either direction through the sleeves 25 and 26 will compress one or the other of the springs.

The end of the rod 27 projecting through the sleeve 26 has a coupling housing 32 secured thereon or formed integral therewith. The housing 32 carries on the side thereof a closure member 33 pivotally connected thereon as at 34. The closure member 33 and the housing 32 define a segmental spherical socket 35 with an annular opening 36 thereto at the bottom thereof. The closure member 33 is bifurcated as at 37 at the free end thereof and a bolt 38 secured to the housing 33 extends through the bifurcation to receive a wing nut 39 thereon for tightening the closure member 33 against the housing 32.

The housing 32 has a portion 40 extending therefrom on the back side thereof having a cylindrical bore 41 therethrough. A seating element 42 is slidable in the bore 41 and has a segmental spherical depression 43 in the face thereof communicating with the segmental spherical socket 35 through an opening 44 in the socket wall. The seating element 42 has a shank portion 45 extending from the back thereof. A coiled spring 46 is disposed around the shank portion 45 between the seating element 42 and a closure plate 47 secured in the portion 40 of the housing. The coiled spring 46 urges the seating element 42 toward the opening 44 in the socket wall.

The portion B of the hitch comprises a stud 50 having a ball end 51, a cylindrical shank portion 52, a collar portion 53 between the ball end and the cylindrical shank 52 and a threaded end 54 on the shank portion 52. A draw bar 55 secured to the propelling vehicle and having an eye end 56 thereon receives the shank 52 of the stud member. A nut 57 is threaded on the end 54 of the stud to rigidly hold the stud 50 on the draw bar 55. The collar portion 53 of the stud abuts the top of the eye 56 of the draw bar.

The part A of the hitch is coupled to the part B by merely loosening the wing nut 39 so as to be able to swing the bolt 38 out of engagement with the closure member 33 on the housing 32. The closure member 33 is then swung open about its pivot point 34 and the ball end 51 of the stud seated in the socket 35. The closure member 33 is then swung back to receive the bolt 38 and the nut 39 is tightened to force the closure member against the housing 32. The ball end 51 of the stud is freely rotatable and tiltable in the socket 35 and wear developed during use of the joint is automatically compensated by the spring urged seating member 42 which engages a portion of the ball end 51 and is constantly urged against this ball end.

A pulling of the draw bar 55 by the propelling vehicle causes the tongue or rod 27 to move forwardly and compress the heavy spring 30 between the collar 28 and the boss 21 of the frame member 11. Thus a resilient spring connection is maintained between the propelling vehicle and the towed vehicle. When the towed vehicle surges forwardly on the propelling vehicle the frame member 11 moves forwardly on the rod 27 to release the spring pressure 30 and cause a compression of the spring 31. This forward movement of the frame member 11 relative to the rod 27 causes the rod to move the shank 18 of the plunger into the master cylinder 16 thereby compressing the fluid therein and automatically applying the brakes of the towed vehicle. A braking of the towed vehicle is therefore automatically effected whenever the towed vehicle urges forwardly on the propelling vehicle such as occurs when the towed vehicle is going down hill or when the brakes are suddenly applied on the propelling vehicle.

It should be understood that while a master cylinder 16 has been described for operating hydraulic brakes, that the rod 27 can also actuate mechanical brakes by merely causing the rod to move a cam or other actuating arm operatively connected through brake rods or cables to the trailer brakes.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. A trailer hitch comprising a frame member having a flat plate portion adapted to be secured to a trailer and a cylindrical portion extending laterally therefrom, said cylindrical portion having a chamber therein intermediate the ends thereof, a tongue member slidable through the cylindrical portion of the frame member, a collar secured to the tongue member in the chamber of the cylindrical member, coiled springs disposed around the tongue member between the collar and the cylindrical member on each side of the collar, a fluid-tight cylinder mounted on the flat plate portion of the frame having a plunger therein with a shank extending therefrom into abutting relation with the end of the tongue, a tube leading from said cylinder to transmit fluid therefrom to operate the brakes of a trailer whereby a drawing of the tongue member away from the frame member will compress one of the springs to pull the frame member and the trailer while a forward surging of the frame member onto the tongue will move the plunger in the cylinder for compressing the fluid therein to actuate the trailer brakes.

2. A trailer hitch comprising a frame member having a rear plate portion adapted to be secured to a trailer and a pair of longitudinally spaced bearing bosses on said frame member in front of the plate portion, a tongue member slidable through the bearing bosses, an abutment member secured to the tongue between the bearing bosses, a coiled spring disposed around the tongue on one side of the abutment member and adapted to abut said member at one end thereof and one of the bosses at the other end thereof, a second coiled spring disposed around the tongue on the other side of the abutment member and adapted to abut said member at one end thereof and the other of the bosses at the other end thereof, a brake control device mounted on said rear plate portion of the frame member including a member adapted to be moved rearwardly to operate the trailer brakes, said movable member adapted to engage the end of the tongue whereby a pulling of the tongue will move the end thereof away from the movable member and a forward surging of the frame member onto the tongue will cause the tongue to move the movable member rearwardly to actuate the trailer brakes.

3. A trailer hitch comprising a frame member having a rear plate portion adapted to be secured to the front end of a trailer and a pair of longitudinally spaced bearing bosses on the frame member in front of the plate portion, a tongue member slidable through the bearing bosses, an abutment member secured to the tongue between the bearing bosses, coiled springs disposed around the tongue member between the abutment member and each of the bearing bosses, a fluid tight cylinder mounted on the plate portion of the frame having a plunger therein with a shank extending therefrom toward the end of the tongue member and adapted to abut said end, and a tube leading from said cylinder to transmit fluid therefrom to operate the brakes of a trailer whereby a drawing of the tongue member away from the frame member will compress one of the springs to pull the frame member and the trailer while a forward surging of the frame member onto the tongue will compress the other of said springs and move the plunger shank against the end of the tongue to force the plunger into the cylinder for compressing fluid therein to actuate the trailer brakes.

MATTHEW P. GRAHAM.
GEORGE H. HUFFERD.
JOSEPH E. CASSE.